(12) United States Patent
Oike et al.

(10) Patent No.: US 9,110,176 B2
(45) Date of Patent: Aug. 18, 2015

(54) RADIATION DETECTING ELEMENT

(75) Inventors: Tomoyuki Oike, Yokohama (JP);
Nobuhiro Yasui, Yokohama (JP); Toru Den, Tokyo (JP); Yoshihiro Ohashi, Tokyo (JP); Ryoko Horie, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 569 days.

(21) Appl. No.: 13/473,005

(22) Filed: May 16, 2012

(65) Prior Publication Data

US 2012/0312999 A1    Dec. 13, 2012

(30) Foreign Application Priority Data

Jun. 7, 2011    (JP) .................................. 2011-127078

(51) Int. Cl.
*G01T 1/20*    (2006.01)
*G01T 1/202*    (2006.01)

(52) U.S. Cl.
CPC .............. *G01T 1/202* (2013.01); *G01T 1/2018* (2013.01)

(58) Field of Classification Search
CPC ............................. G01T 1/202; G01T 1/2018
USPC ...................................... 250/361 R, 362, 366
See application file for complete search history.

(56) References Cited

U.S. PATENT DOCUMENTS

| 8,138,011 | B2* | 3/2012 | Saito et al. ....................... 438/69 |
| 8,624,194 | B2* | 1/2014 | Ueyama et al. ................ 250/366 |
| 2007/0164223 | A1* | 7/2007 | Hennessy et al. .......... 250/361 R |
| 2009/0101844 | A1* | 4/2009 | Ohbayashi ................. 250/488.1 |
| 2011/0248366 | A1* | 10/2011 | Saito et al. ..................... 257/429 |
| 2012/0068078 | A1* | 3/2012 | Zhang et al. ............. 250/370.08 |
| 2012/0256093 | A1* | 10/2012 | Ueyama et al. ................ 250/366 |
| 2012/0312999 | A1* | 12/2012 | Oike et al. ..................... 250/367 |

OTHER PUBLICATIONS

T. Jing et al., "Amorphous Silicon Pixel Layers with Cesium Iodide Converters for Medical Radiography", *IEEE Transactions on Nuclear Science*, vol. 41, No. 4, pp. 903-909 (Aug. 1994).

* cited by examiner

*Primary Examiner* — Casey Bryant
(74) *Attorney, Agent, or Firm* — Fitzpatrick, Cella, Harper & Scinto (57) ABSTRACT

Provided is a radiation detecting element, including: needle crystal scintillators and a protruding pattern in which: one end of the needle crystal scintillators is in contact with of upper surfaces of the multiple protrusions; a gap corresponding to a gap between the multiple protrusions is provided between portions of the needle crystal scintillators in contact with the upper surfaces of the multiple protrusions; and a number of the needle crystal scintillators in contact with one of the upper surfaces is 5 or less. Conventionally, since the needle crystals exhibit a state of a polycrystalline film in an early stage of vapor deposition, and light also spreads in a horizontal direction, the light received by a photodetector portion and the spatial resolution was lower than ideal values. The present invention enables the deviating region to be the ideal state in an early stage of growth.

10 Claims, 7 Drawing Sheets

RADIATION DETECTING ELEMENT

BACKGROUND OF THE INVENTION

1. Field of the Invention

The present invention relates to an imaging detecting element using a scintillator, which is caused to emit light by radiation.

2. Description of the Related Art

In a flat panel detector (FPD) to be used for X-ray imaging in clinical practice and the like, X-rays that has passed through a subject is received by a scintillator, and light emitted by the scintillator is detected by a photodetector. As a scintillator crystal portion, cesium iodide needle crystals formed by vapor deposition are used due to their ability of efficiently transmit emitted light to the photodetector. The needle crystals stand perpendicularly to the photodetector, and thus, a gap of air is naturally formed between the needle crystals. It is considered that, owing to the ratio between the refractive index of cesium iodide (about 1.8) and the air (1.0), light is totally reflected within the cesium iodide needle crystals having the higher refractive index to be effectively guided to the photodetector.

SUMMARY OF THE INVENTION

Figure 8A:
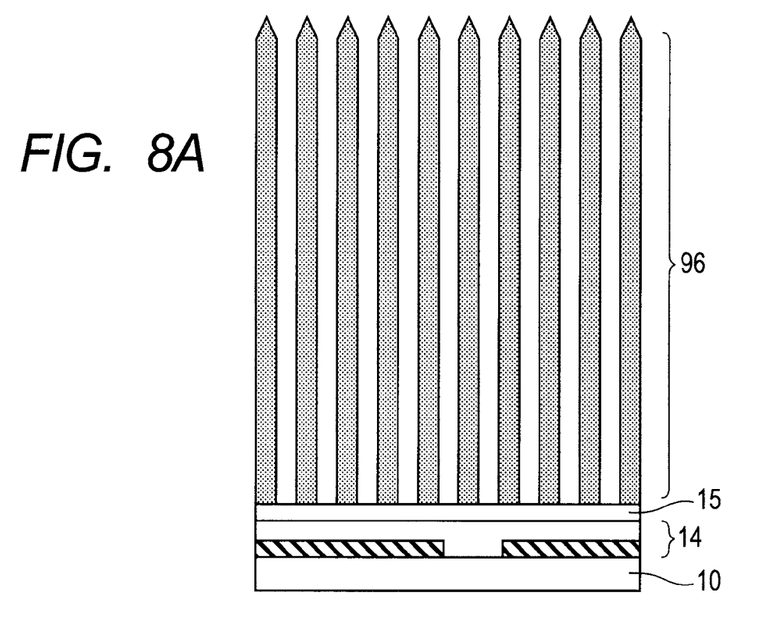
FIG. 8A is a partial enlarged view of ideal needle crystals in a conventional radiation detecting element.
Figure 8B:
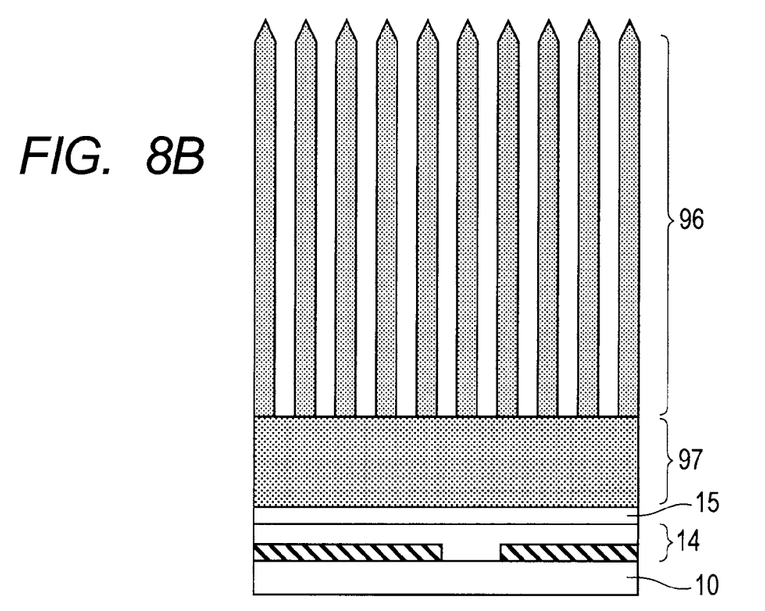
FIG. 8B is a partial enlarged view of actual needle crystals in the conventional radiation detecting element.

Referring to FIG. 8A, in conventional descriptions, it have been expressed that needle crystals 96 grows uniformly from an early stage of the vapor deposition with a gap therebetween. However, according to a study of the inventors, it was found that particles are small and almost no gap is observed in the region in an early stage of the vapor deposition, and the actual state is far from the ideal state as illustrated in FIG. 8A. More specifically, as shown in FIG. 8B, portions which grew in an early stage of the vapor deposition were a polycrystalline film 97 of non-needle crystal particles. Since light would also spread in a horizontal direction in this situation, the actual amount of light received by a unit area of a photodetector portion as well as the actual spatial resolution of the photodetector portion are lower than values estimated in the ideal state. In a final stage of the vapor deposition with a film of several hundreds of micrometers being formed, however, ideal needle crystals are obtained. Therefore, in order to improve the amount of received light, the spatial resolution, and the like, it is desired to secure the deviating region to grow as the ideal state in an early stage of growth.

In view of the above-mentioned problem, according to the present invention, there is provided a radiation detecting element, including: needle crystal scintillators; and a protruding pattern including multiple protrusions, in which: one end of the needle crystal scintillators is in contact with of upper surfaces of the multiple protrusions; a gap corresponding to a gap between the multiple protrusions is provided between portions of the needle crystal scintillators where the needle crystal scintillators are in contact with the upper surfaces of the multiple protrusions; and a number of the needle crystal scintillators in contact with an upper surface of one of the multiple protrusions is 5 or less.

The number of particles of the needle crystal scintillator in contact with the upper surfaces of the protrusions may be determined by comparing an image obtained through use of a scanning electron microscope of the upper surfaces of the protrusions with an image obtained through use of a scanning ion microscope of the needle crystal scintillator in contact with the upper surfaces of the protrusions of the same region.

With a protruding pattern layer in which the protrusions are arranged in a specific shape according to the present invention, the number of the particles of the needle crystal scintillator, which corresponds to each of the protrusions, can be extremely small, and thus, the needle crystals are effectively separated from one another even in an early stage of growth of the scintillator, and light emitted by the scintillator may be guided to a photodetector portion with reduced spreading. Hence, the amount of light which reaches the photodetector portion and received thereby can be increased, and, as a result, the sensitivity of the element can be improved. Further, dispersion of light emitted by the scintillator is suppressed, and thus, the resolution of the element is improved.

Further features of the present invention will become apparent from the following description of exemplary embodiments with reference to the attached drawings.

DESCRIPTION OF THE EMBODIMENT

Preferred embodiments of the present invention will now be described in detail in accordance with the accompanying drawings.

Figure 1A:
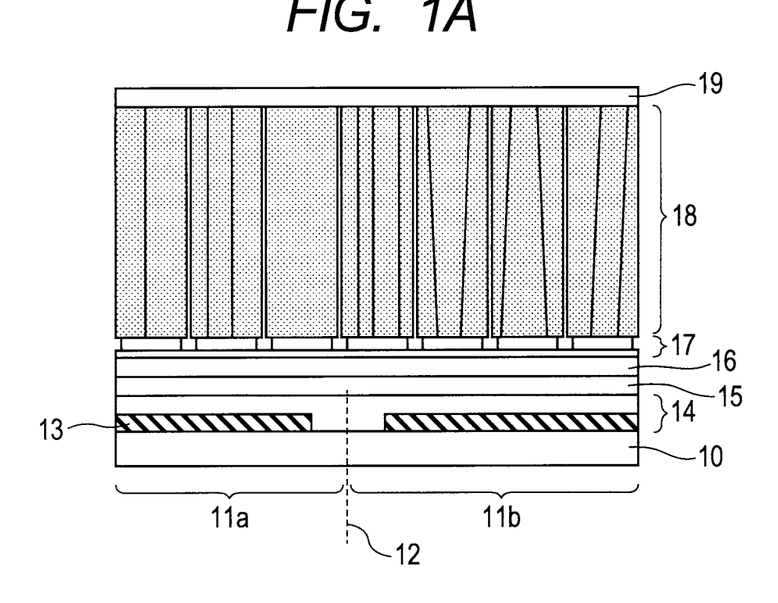
FIG. 1A is a sectional view of a radiation detecting element according to an embodiment of the present invention.
Figure 1B:
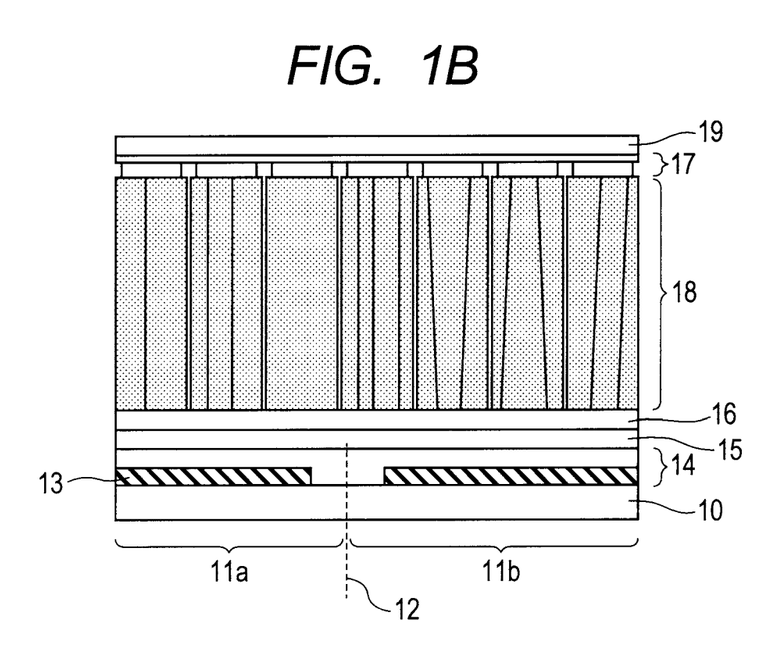
FIG. 1B is a sectional view of a radiation detecting element according to another embodiment of the present invention.

FIGS. 1A and 1B illustrate a typical structure of the embodiment of the present invention.

A radiation detector of this embodiment has multiple pixels on provided on a substrate 10. A pixel 11a and a pixel 11b adjacent thereto are separated by a pixel boundary 12. Each of the pixels includes a photodetector portion 13, which is configured to function as a photodetector, and each of the pixels functions as a radiation detecting element. As illustrated in FIG. 1A, there is a case where a photodetection layer 14, a protective layer 15, an underlayer 16, a protruding pattern layer 17, an needle crystal scintillator layer 18, and a reflective layer 19 are formed in the stated order from the substrate 10 side, and, as illustrated in FIG. 1B, there is a case where the photodetection layer 14, the protective layer 15, the underlayer 16, the needle crystal scintillator layer 18, the protruding pattern layer 17, and the reflective layer 19 are formed in the stated order from the substrate 10 side. In any of these cases, one end of the needle crystal scintillator is placed to be in contact with upper surfaces of protrusions that form the protruding pattern layer. The former element can be manufactured by undergoing processes in succession on the photodetection layer 14, and the latter element may be manufactured by, after providing the protruding pattern layer 17 on the reflective layer 19 side and forming the needle crystal scintillator layer 18 by vapor deposition, bonding the structure and the photodetection layer 14 together. The protective layer 15 is provided for the purpose of mechanically and electrically protecting the photodetection layer 14, and it may have any of a single layer structure and a multiple layer structure. When the needle crystal scintillator layer 18 is formed of an alkali halide-based material, the protective layer 15 can be configured to have a function to prevent degradation of the photodetection layer 14 due to diffusion of halogen.

It is preferred to provide the reflective layer 19 on the side opposite to the photodetection layer 14 with respect to the needle crystal scintillator layer 18, so that light from the needle crystal scintillator layer 18 can be suitably guided toward the photodetector portion 13. In particular, in the case of the structure illustrated in FIG. 1B, it is preferred that the protruding pattern layer 17 have a high transmittance with respect to scintillation light and have a refractive index that is lower than that of the needle crystal scintillator layer 18, or, the protruding pattern layer 17 have the function of the reflective layer 19. More specifically, in the structure illustrated in FIG. 1A, it is preferred that the protruding pattern layer 17 have a high transmittance with respect to scintillation light emitted by the needle crystal scintillator layer 18, while, in the structure illustrated in FIG. 1B, it is preferred that the protruding pattern layer 17 be formed of a resist material such as SU8 which has a high transmittance with respect to scintillation light and has a refractive index that is lower than that of the needle crystal scintillator layer 18, or, that the protruding pattern layer 17 be formed of a metal material or the like having a high reflectivity. This may cause scintillation light which comes to an opposite side of the photodetector portion 13 to be effectively reflected. In the structure described above, insofar as light emitted by the needle crystal scintillator layer 18 is not prevented from going toward the photodetector portion 13 and sufficient detection sensitivity is secured, additional layer may also be provided to the structures illustrated in FIGS. 1A and 1B. In an actual radiation detecting element, a number of constituent members which are not illustrated in FIGS. 1A and 1B, including thin film transistors (TFT) provided in the respective pixels, are included other than the photodetector portion 13 of the photodetection layer 14. For the sake of brief description of the present invention, however, members which are not essential for the present invention are omitted herein.

Figure 2A:
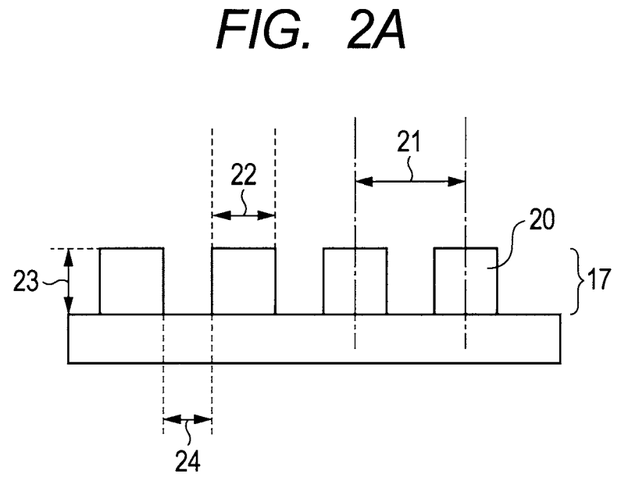
FIG. 2A is a sectional view of the structure of an underlayer according to an embodiment of the present invention.
Figure 2B:
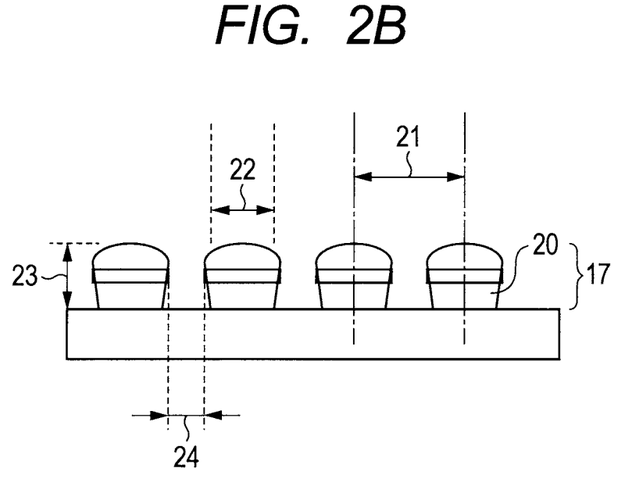
FIG. 2B is a sectional view of the structure of an underlayer according to another embodiment of the present invention.

FIG. 2A and FIG. 2B illustrate structures of the protruding pattern layer 17 of the embodiment. Protrusions 20 are arranged in the protruding pattern layer 17. The center to center distance between closest protrusions is herein referred to as a protrusion pitch 21 and the gap between closest protrusions is herein referred to as a protrusion gap 24. The distance between the top of the protrusions and the underlayer (portion other than the protrusions) is herein referred to as a protrusion height 23 and the width of a protrusion seen from above is herein referred to as a protrusion size 22. When a protrusion seen from above is circular, the protrusion size 22 is the diameter, and, when a protrusion seen from above is polygonal, oval, or a figure bounded by curves, the protrusion size 22 is the diameter of the circumcircle.

The needle crystal scintillator starts to grow from tips of the protrusions 20 arranged in the protruding pattern layer 17 of the embodiment of the present invention. It is found by study by the inventors that, in order that the scintillator sufficiently functions as a needle crystal scintillator even from an early stage of the growth, the protruding pattern layer is required to have a structure in which the protrusion pitch 21 is 10 μm or less. If the pitch is larger, a lot of needle crystals grow from one protrusion 20, resulting in disturbing an early stage layer, and the effect of the present invention cannot be obtained. This state in which a lot of needle crystals grow on the upper surface of a protrusion 20 may be regarded, from the viewpoint of spread of light emitted by the scintillator, as the same state as that in a conventional vapor deposited film. Further, since the diffusion length of high energy electrons and holes generated by entered radiation is about 2 μm, if the size of the needle crystals seen from above is smaller than 2 μm, the amount of light emitted by the scintillator is expected to be reduced. Therefore, in order that the size of the needle crystals seen from above can be 2 μm or more, it is preferred that the protrusion pitch 21 be also 2 μm or more. In summary, it is preferred that the protrusion pitch 21 be in a range of 2 μm or more and 10 μm or less. It is more preferred that the protrusion pitch 21 be in a range of 5 μm or more and 10 μm or less. Note that, the size of the needle crystals as used herein refers to, similarly to the case of the protrusion size 22, the width of an needle crystal scintillator particle seen from above.

Further, in order to obtain the effect of the present invention, it is preferred that the protrusion size 22 be 0.4 times or more and 0.8 times or less as much as the protrusion pitch 21. It is more preferred that the protrusion size 22 be 0.4 times or more and 0.7 times or less as much as the protrusion pitch 21.

Further, in order to obtain the effect of the present invention, it is preferred that the protrusion height 23 be at least 0.4 times or more as much as the protrusion gap 24. If the protrusion height 23 is smaller, that is, in a structure in which the protrusion gap 24 is relatively large with respect to the protrusion height 23, there is no difference between growth of the scintillator in a region that does not have the protrusions and growth of the scintillator from the upper surfaces of the protrusions 20, and the effect of the provision of the protrusions is less likely to be obtained, which is not preferred. Further, when the protrusion height 23 is more than 2.5 times as much as the protrusion gap 24, the effect of the provision of the protrusions is less likely to be obtained because, for example, the flatness of the upper surfaces of the protrusions is lost in manufacture, which is not preferred.

Table 1 shows the flatness of the upper surfaces of the protrusions and the degree of separation of the needle crystals, in relation with the protrusion height, in an early stage of the vapor deposition in protruding patterns having protrusion pitch of 5 µm, protrusion size of 3 µm, and protrusion gap of 2 µm, which were manufactured in examples of the present invention. The flatness of the upper surfaces of the protrusions can be determined by observation under a scanning electron microscope of cross sections after the protruding patterns having different protrusion heights are formed. The degree of separation in an early stage of the vapor deposition can be determined by observation under a scanning electron microscope of, for example, a CsI vapor deposited film at a thickness of about 10 µm formed on protruding patterns having different protrusion heights. From Table 1, it is found that the protrusion height is preferably 0.4 to 2.5 times as much as the protrusion gap.

TABLE 1

| Protrusion height (µm) | 0.0 | 0.4 | 0.8 | 1.0 | 2.0 | 3.0 | 5.0 | 7.0 | 10.0 |
|---|---|---|---|---|---|---|---|---|---|
| Flatness of upper surface of protrusion | − | + | + | + | + | + | + | − | − |
| Degree of separation in early stage of vapor deposition | − | − | + | + | + | + | + | + | + |

Figure 3A:
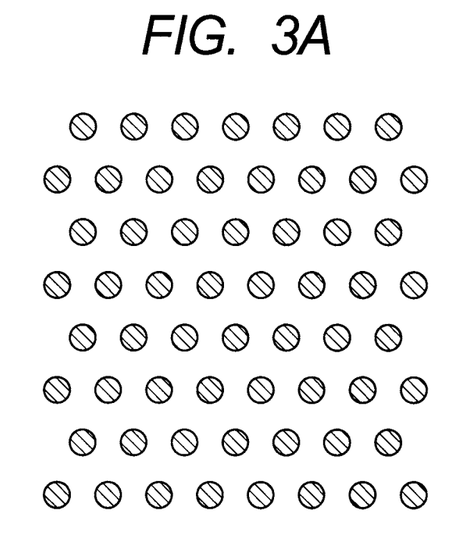
FIG. 3A is an explanatory diagram of a hexagonal arrangement of protrusions according to an embodiment of the present invention.
Figure 3B:
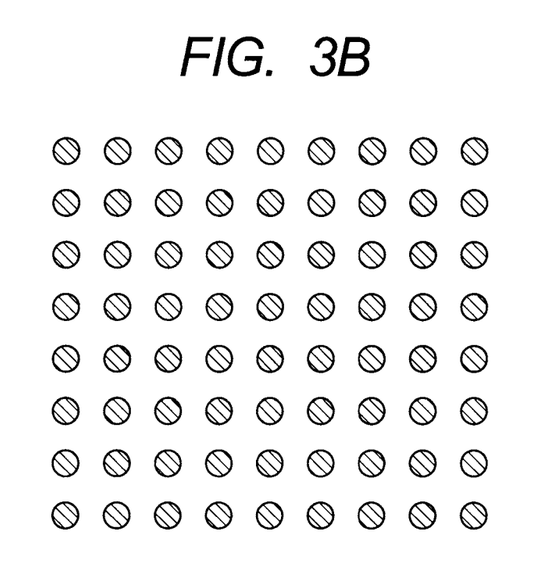
FIG. 3B is an explanatory diagram of a square arrangement of protrusions according to another embodiment of the present invention.

FIGS. 3A and 3B illustrate exemplary arrangements of the protrusions 20 (protruding patterns) seen from above. A hexagonal arrangement (FIG. 3A) of the protruding pattern in which the pitch is isotropic within the plane and the gap is uniformly formed is preferred. However, the present invention is not limited thereto, and a square arrangement (FIG. 3B) and the like are also possible. With regard to the needle crystal scintillator formed on the protruding pattern layer of the embodiment, it is not necessarily required that the arrangement of the protrusions be completely maintained up to the needle crystal scintillator portion. Insofar as the needle crystals in an early stage of growth of the scintillator are effectively separated from one another, light emitted by the scintillator can be guided to the photodetector portion with reduced spreading, and as a result, the amount of light which reaches the photodetector portion and received thereby can be increased.

Ordinary photolithography can be adopted as a method of forming the protrusions 20 described above. In this case, a polyimide resist can be formed such that the resist itself has a protruding structure, and the formed resist can be used as the protrusions of the embodiment. It is also possible to apply a resist on a Si, glass, or carbon-based substrate, process the resist, and then etch the substrate to form protrusions. It is also possible to use imprint method from the viewpoint of the cost. In any of the cases, a material containing a light element can be preferably used as a main component for forming such protrusions.

Although there is no limitation on the method of growing the needle crystals on the protruding pattern layer 17, vacuum deposition is practical since a film can be formed at high speed. For example, charging CsI powder and TlI powder into different vapor deposition boats, respectively, and heating the CsI boat to 700° C. and the TlI boat to 300° C. to carry out co-deposition, and to thereby grow the needle crystals. As more specific parameters, for example, the substrate temperature can be 200° C., the Ar gas pressure in film formation can be 0.8 Pa, the Tl content of a luminescent center can be about 1 to 2 mol %, and the film thickness can be 200 µm. Depending on the size and the pitch of the protrusions, it is preferred not to limit the parameters to conventional ones, i.e., the substrate temperature of 200° C. and the Ar gas pressure of 0.8 Pa when a conventional needle crystal film is formed. In particular, when the protrusion size 22 is larger than about 5 µm, which is the average size of conventional needle crystals, it is preferred that the substrate temperature be higher, or, the Ar gas pressure be lower. When the protrusion size 22 is smaller than the average size of conventional needle crystals, it is preferred that the substrate temperature be lower, or, the Ar gas pressure be higher. Those parameters are effective by controlling the diffusion length of the vapor deposition material. As described above, insofar as the shape of the protruding pattern falls within the scope of the present invention, by selecting optimum vapor deposition conditions, the effect of the present invention at the maximum may be obtained.

With regard to the material for forming the needle crystals, there is no limitation, but it is particularly preferred to use CsI. It is also preferred to use, as an alkali halide, any one of compositions of the quaternary system of (Cs,Rb).(I,Br), NaI, or the like.

(Analysis of Number of Particles on Protrusions)

Figure 6A:
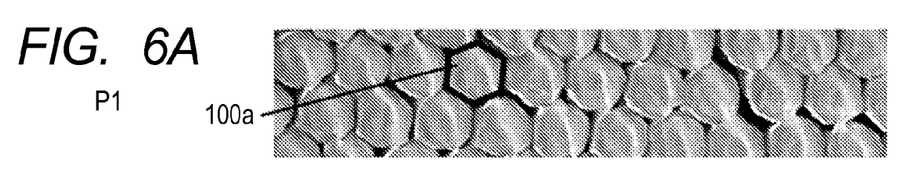
FIG. 6A is an image obtained through use of a scanning electron microscope according to Example 1 of the present invention.
Figure 6B:
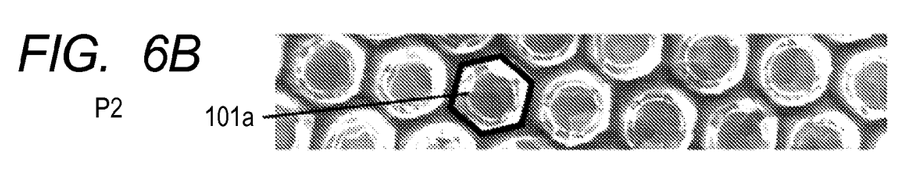
FIG. 6B is an image obtained through use of a scanning electron microscope according to Example 2 of the present invention.
Figure 6C:
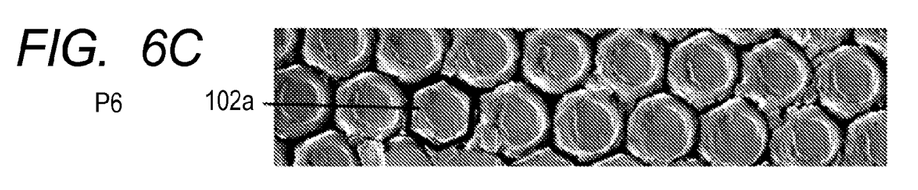
FIG. 6C is another image obtained through use of a scanning electron microscope according to Example 2 of the present invention.
Figure 7A:
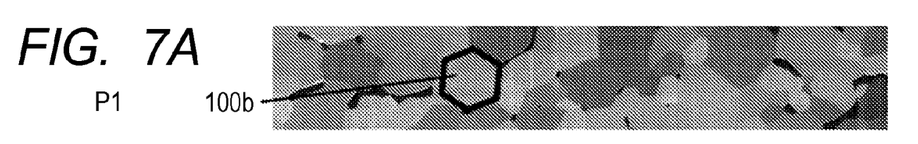
FIG. 7A is an image obtained through use of a scanning ion microscope according to Example 1 of the present invention.
Figure 7B:
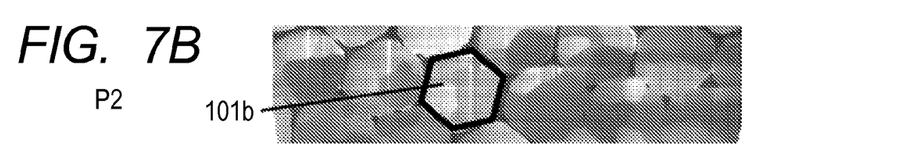
FIG. 7B is an image obtained through use of a scanning ion microscope according to Example 2 of the present invention.
Figure 7C:
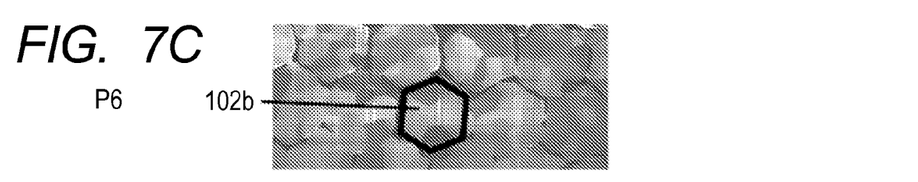
FIG. 7C is another image obtained through use of a scanning ion microscope according to Example 2 of the present invention.

A method of determining the number of particles of a needle crystal scintillator in contact with upper surfaces of protrusions is described in the following. Separating the needle crystal scintillator, formed on a substrate having the protrusions, from the substrate, and the surface of the separation is observed under a scanning electron microscope to obtain images of the scanning electron microscope (FIGS. 6A to 6C). Then, the surface of the separation is processed, i.e., dug by, for example, about 20 µm in a depth direction using a focused ion beam. The processed surface is observed under a scanning ion microscope to obtain images of the scanning ion microscope (FIGS. 7A to 7C). Since the contrast in the images obtained through use of a scanning ion microscope (channeling contrast) is caused due to, for example, the difference in the amount of secondary electrons generated when $Ga^-$ ions usually used in focused ion beam processing are applied to a sample, the crystal orientation of the particles forming the samples can be clearly observed. Average numbers of needle crystal scintillator particles 100b, 101b, and 102b in contact with the upper surfaces of the protrusions determined by the images obtained through use of the scanning ion microscope (FIGS. 7A to 7C), in regions 100a, 101a, and 102a corresponding to protrusions determined by the images obtained through use of the scanning electron microscope (FIGS. 6A to 6C), respectively, are determined. For example, for one kind of the protruding pattern, the number of the needle crystal scintillator particles is determined with regard to about 5 to 10 protrusions, and then, the average of those numbers is determined.

(Improvement of Amount of Received Light)

An image sensor of a radiation detecting element includes multiple, for example, 4,000×4,000 pixels. In a conventional needle crystal scintillator formed on a pixel-sized pattern, although a gap in the needle crystal scintillator can be observed between the pattern, there is a problem to be solved by the present invention that, within one pixel, no gap is observed in the needle crystal scintillator in an early stage of vapor deposition.

Further, it is conventionally known that, when the needle crystal scintillator is caused to grow on a protruding pattern having a smaller size than the above-mentioned pixel size, although a gap is observed in the needle crystal scintillator on the protrusions, a study by the inventors revealed that, in some case the amount of light received by the photodetector portion increased while in another case the amount of light received by the photodetector portion did not increase.

The inventors of the present invention studied over and over on the above, and have reached the following understanding. In order to increase the amount of received light, it is not sufficient just to provide gaps between protruding pattern formed on an underlayer, of which upper surfaces being in contact with an needle crystal scintillator. More specifically, it is necessary that in addition to the presence of the gaps, the number of needle crystal scintillator particles in contact with the upper surface of a protrusion be 5 or less. In order to determine the number of the particles, it is insufficient merely by an observation using an ordinary image obtained through use of a scanning electron microscope, and determination is possible with use of an image obtained through use of a scanning ion microscope.

As is clear from the above, there is a case where an needle crystal scintillator conventionally thought to be formed of a single particle may actually be formed of multiple particles, and such a case is also within the scope of the present invention.

Table 2 shows the relationship between the number of the needle crystal scintillator particles on a protrusion and an improvement rate of the amount of light which reaches the photodetector portion and received thereby in protruding patterns when the protrusion height is 3 μm in the examples of the present invention. From Table 2, it is found that, when the average number of the particles per protrusion is 5 or less, the amount of received light is preferably improved. Further, it is preferred that the gap between protrusions be 1.5 μm or more. Further, from the viewpoint of the improvement rate of the amount of received light, the average number of the particles is more preferably 2 or less, and the average number of the particles is most preferably 1, because the needle crystal scintillator particle is ideally formed on the upper surface of a protrusion in a one-to-one relationship.

TABLE 2

| Protruding pattern | Protrusion pitch (μm) | Protrusion size (μm) | Protrusion gap (μm) | Number of particles per protrusion (on average) | Improvement rate of amount of received light (%) |
| --- | --- | --- | --- | --- | --- |
| P1 | 5.0  | 3.0 | 2.0 | 1.83 | 18.0 |
| P2 | 10.0 | 6.0 | 4.0 | 4.30 | 4.0  |
| P3 | 10.0 | 4.0 | 6.0 | 3.75 | 9.0  |
| P4 | 7.5  | 3.0 | 4.5 | 3.00 | 7.0  |
| P5 | 7.5  | 6.0 | 1.5 | 2.92 | 6.0  |
| P6 | 15.0 | 7.5 | 7.5 | 9.38 | −1.0 |
| P7 | 7.5  | 5.0 | 2.5 | 3.43 | 9.0  |

EXAMPLES

Radiation detecting elements according to the examples of the present invention are described in detail in the following.

Comparative Example 1

CsI was vapor deposited by the above-mentioned vacuum deposition on an upper surface of a glass substrate having a protective layer of a polyimide with no protruding pattern layer formed thereon. CsI powder and TlI powder were charged into different vapor deposition boats, respectively. By heating the CsI boat to 700° C. and heating the TlI boat to 300° C., co-deposition was carried out. With regard to other parameters, the substrate temperature was 200° C. and the Ar gas pressure in film formation was 0.8 Pa. An image obtained through use of a scanning electron microscope revealed that, in Comparative Example 1 in which the film thickness was 200 μm, similarly to the case of a conventional needle crystal vapor deposited film, the degree of separation in an early stage of the CsI vapor deposited film was low. Further, from observation of the image obtained through use of a scanning electron microscope, while the size of the needle crystals in an early stage of the CsI vapor deposition was estimated to be 2.0 μm, it was confirmed that the sizes of the needle crystals at film thicknesses of about 20 μm and about 200 μm were 4.0 μm and 8.2 μm, respectively.

In the following Examples 1 and 2, change in the amount of received light obtained by the structures of the following respective examples with respect to the amount of received light obtained by the photodetector portion of the radiation detecting element having the scintillator layer of Comparative Example 1, that is, the effect of the present invention, is described.

Example 1

First, a process of forming the protruding pattern is described.

Figure 4A:
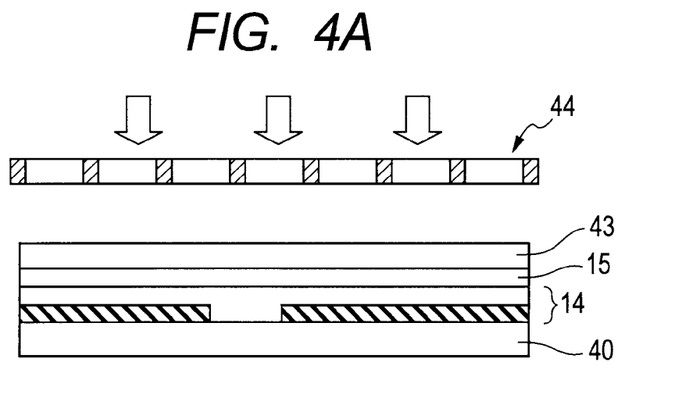
FIGS. 4A and 4B are explanatory diagrams of a process of forming protrusions according to examples of the present invention.
Figure 4B:
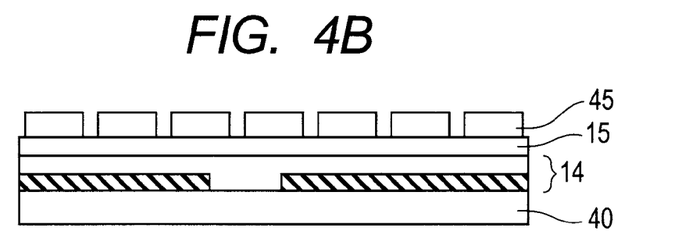
Figure 4C:
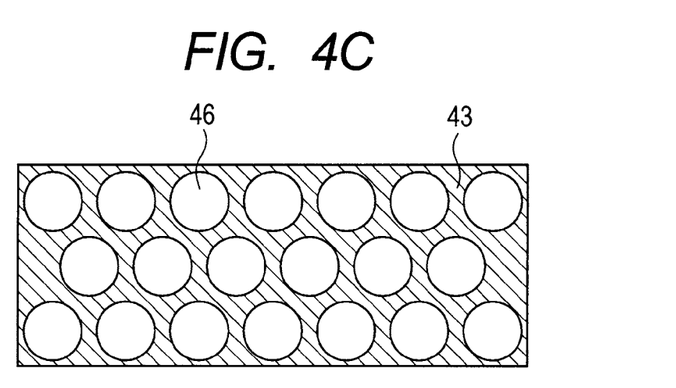
FIG. 4C is a plan view of a protruding pattern according to the examples of the present invention.

FIGS. 4A and 4B are sectional views illustrating the concept of the process of forming the protruding pattern of Example 1 of the present invention. A resist 43 was applied to an upper surface of a glass substrate 40 having a protective layer 15 of a polyimide formed thereon as illustrated in FIG. 4A. Through use of photolithography, a protruding pattern layer 45 as illustrated in FIG. 4B was formed. When, as the resist 43, an epoxy resin-based negative photoresist, for example, SU8, is used, film thickness and the size can be controlled by adjusting the light exposure amount and the baking time after the exposure. In the resist portion exposed through a mask substrate 44 having a Cr pattern formed therein, by carrying out baking at 65° C. for 1 minute and further at 90° C. for 2 minutes after the exposure, cross-linking and fixing in the resist portion were caused to progress. After that, a developer "SU8 developer" was used to remove the resist of a portion which was not exposed to form the protruding pattern layer 45 of SU8. Here, seen in plan view, in the protruding pattern layer, a protruding pattern 46 was a hexagonal arrangement as illustrated in FIG. 4C.

The protrusions were in the shape of circular cylinders as illustrated in the above-mentioned sectional view of FIG. 2A, or in the shape of circular cylinders with rounded upper surfaces as illustrated in FIG. 2B. Here, a protruding pattern P1 having a protrusion pitch of 5 μm, a protrusion size of 3 μm, and a protrusion gap of 2 μm was formed. The protrusion height was 3 μm.

Figure 5A:
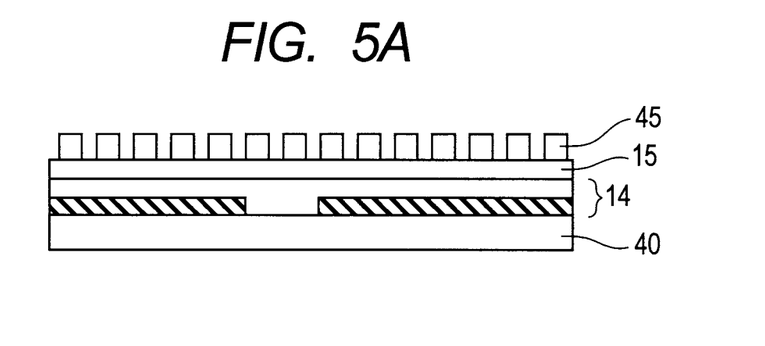
FIG. 5A is an explanatory diagram of a process of forming a scintillator layer according to the examples of the present invention.
Figure 5B:
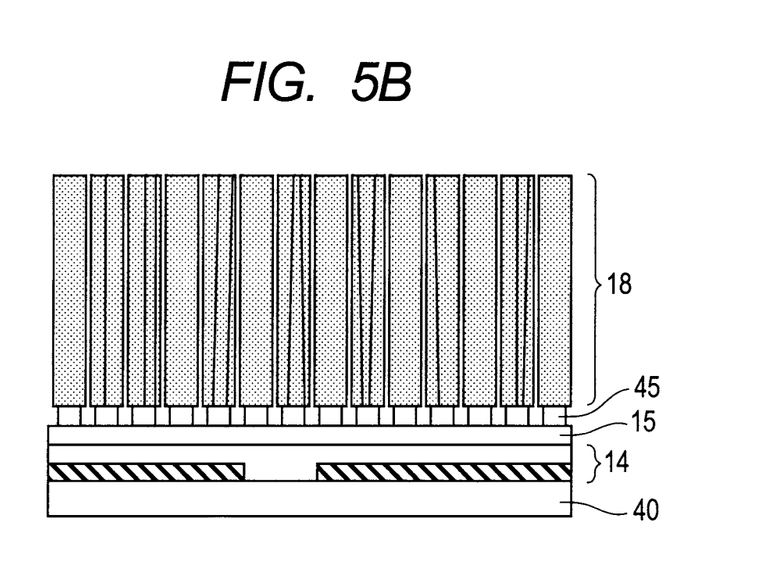
FIG. 5B is an explanatory diagram of a scintillator layer formed in the examples of the present invention.

Next, a process of forming the scintillator layer on the protruding pattern layer is described. FIGS. 5A and 5B are sectional views of the above-mentioned example. The scintillator needle crystals were caused to grow on an upper surface of the protruding pattern layer 45. CsI powder and TlI powder were charged into different vapor deposition boats, respectively. By heating the CsI boat to 700° C. and heating the TlI boat to 300° C., co-deposition was carried out. With regard to other parameters, the Ar gas pressure was 0.8 Pa and the substrate temperature was 200° C. When the shape of the scintillator layer was observed under a scanning electron microscope (S-5500 manufactured by Hitachi High-Technologies Corporation), as illustrated in FIG. 5B, a state could be confirmed that the needle crystal scintillator layer 18 divided from each other from an early stage of the vapor deposition where the needle crystal scintillator layer 18 was in contact with the protruding pattern layer 45. With regards to a portion in which one needle crystal scintillator particle was formed on one protrusion, while it could be confirmed that the sizes of the needle crystals at film thicknesses of about 20 μm and about 200 μm were 4.1 μm and 6.1 μm, respectively, while an estimated size of the needle crystals at an early stage of the CsI vapor deposition is 4.1 µm. It could thus be confirmed that the change in the size of the needle crystals was smaller than in the case of Comparative Example 1.

Then, the needle crystal scintillator layer 18 was separated from the protruding pattern layer 45, and the surface of the separation was observed under a scanning electron microscope to obtain an image of the scanning electron microscope (P1 of FIG. 6A). Then, the surface of the separation was processed, i.e., dug in the depth direction by 20 µm using a focused ion beam system (FB-2000A manufactured by Hitachi High-Technologies Corporation). The processed surface was observed to obtain an image through use of the scanning ion microscope (P1 of FIG. 7A). The number of the needle crystal scintillator particles 100*b* in contact with the upper surface of a protrusion determined by the image obtained through use of the scanning ion microscope in the region 100*a* corresponding to a protrusion identified by the image obtained with the scanning electron microscope was determined. Similar work was repeated with regard to other protrusions, and the average number of the needle crystal scintillator particles with regard to 12 protrusions in total was determined. The average number was 1.83 (Table 2).

From the above, it could be confirmed that the needle crystal scintillator layer 18 was divided from an early stage of the vapor deposition in which the needle crystal scintillator layer 18 was in contact with the protruding pattern and that the numbers of the needle crystal scintillator particles corresponding to the respective protrusions were extremely small. Further, when the amount of light received by the photodetection layer 14 per unit area was compared with that in the case of Comparative Example 1, the improvement rate of the amount of received light was 18% (Table 2).

Example 2

In a process of forming the protruding pattern which is similar to that of the above-mentioned Example 1, the various kinds of protruding patterns P2 to P7 shown in Table 2 were formed using mask substrates 44 which were different from one another. The scintillator layer 18 was formed thereon and further, similar evaluation was made. In the following, the protruding patterns P2 and P6 are described as examples. The needle crystal scintillator layer 18 was separated from the protruding pattern layer 45, the surface of the separation was observed under a scanning electron microscope to obtain images of the scanning electron microscope (P2: FIG. 6B, P6: FIG. 6C). Then, the surface of the separation was processed, i.e., dug in the depth direction by 20 µm using a focused ion beam system (FB-2000A manufactured by Hitachi High-Technologies Corporation). The processed surface was observed to obtain images of a scanning ion microscope (P2 of FIG. 7B and P6 of FIG. 7C). The numbers of the needle crystal scintillator particles 101*b* and 102*b* in contact with the upper surfaces of protrusions in the regions 101*a* and 102*a* corresponding to protrusions determined by the images of the scanning electron microscope were determined, respectively. Similar work was repeated with regard to other protrusions, and the average numbers of the needle crystal scintillator particles with regard to 12 protrusions in total were determined. The average numbers were 4.30 and 9.38, respectively (Table 2). Similar evaluation was made with regard to other protruding patterns P3, P4, P5, and P7. The average numbers of the needle crystal scintillator particles and the improvement rates of the amount of received light were as shown in Table 2. In order to examine the early stages of the vapor deposition of the needle crystal scintillators, similarly to the case of Example 1, the shapes of the scintillator layers 18 were observed under a microscope.

From the above, it could be confirmed that the needle crystal scintillator layers 18 were divided from early stages of the vapor deposition in which the needle crystal scintillator layers 18 were in contact with the protruding pattern layers 45, respectively, and that the numbers of the needle crystal scintillator particles corresponding to the respective protrusions were 5 or less. Further, when the amounts of light received by the photodetection layers 14 per unit area were compared with that in the case of Comparative Example 1, the improvement rates of the amount of light received by the photodetection layers 14 were from 4 to 9% (Table 2).

Example 3

In a process of forming the protruding pattern which is similar to that of the above-mentioned Example 1, the viscosity of the resist 43 to be used was adjusted, and further, conditions for application of the resist 43 to the glass substrate 40 were adjusted, to form the protruding pattern P1 having different protrusion heights shown in Table 1. Similarly to the case of Example 1, the scintillator layer 18 was formed thereon. However, in Example 3, the vapor deposition time was adjusted so that the film thickness was 10 µm. The shapes of the scintillator layers 18 were observed under a scanning electron microscope (S-5500 manufactured by Hitachi High-Technologies Corporation). The degrees of separation in early stages of the vapor deposition with respect to the protrusion heights were as shown in Table 1. It was found that the separation was made from early stages of the vapor deposition when the protrusion height was 0.8 µm or more, that is, in a range of 0.4 times or more as much as the gap between adjacent protrusions.

Example 4

In the above-mentioned Example 3, the flatness of each of the upper surfaces of the protrusions with regard to the respective protrusion heights was examined. "+" indicates a state in which the unevenness on the upper surface of the protrusion is within 30% of the diameter of the protrusion, and "−" indicates a state in which the unevenness is larger than 30%. The result is shown in Table 1. When the unevenness on the upper surfaces of the protrusions is within 30% of the diameter of the protrusions, change in the size of the needle crystal scintillator particles formed on the upper surfaces of the protrusions may be caused to be smaller. From Table 1, it was found that, when the protrusion height was larger than 5.0 µm, the flatness of the upper surfaces of the protrusions was not maintained. This is thought to be due to the processing accuracy in the process of forming the protruding pattern. From Example 3 and Example 4, it was found that the range of the protrusion height in which both the degree of separation in an early stage of the vapor deposition and the flatness of the upper surfaces of the protrusions were satisfactory was in a range of 0.4 or more to 2.5 or less times as much as the gap between adjacent protrusions.

Comparative Example 2

A reflective film of Al was formed at a thickness of 50 nm on an upper surface of a glass substrate having a protective layer of a polyimide on which protruding pattern layer had not been formed. Similarly to the case of Comparative Example 1, a scintillator layer was formed thereon at a thickness of 200 µm. An image obtained through use of a scanning electron microscope revealed that, in Comparative Example 2, similarly to the case of a conventional needle crystal vapor deposited film, the degree of separation in an early stage of the CsI vapor deposited film was low.

Example 5

A reflective film of Al was provided on the protruding pattern layer formed in the above-mentioned Example 1. The protruding pattern P1 had a protrusion pitch of 5 μm, a protrusion size of 3 μm, a protrusion gap of 2 μm, and a height of 3 μm. An Al film at a thickness of 50 nm was formed on a glass substrate having the protruding pattern formed thereon. Similarly to the case of Example 1, the scintillator layer 18 was formed thereon, and similar evaluation was made. In Example 5, also, it could be confirmed that the needle crystal scintillator layer 18 was divided from an early stage of the vapor deposition in which the needle crystal scintillator layer 18 was in contact with the protruding pattern, and that the numbers of the needle crystal scintillator particles corresponding to the respective protrusions were 5 or less on average. Further, when the amount of light received by the photodetection layer 14 per unit area was compared with that in the case of Comparative Example 2, the amount of received light was increased.

As described above, according to the radiation detecting element of the embodiment of the present invention, when the protrusion pitch is 2 μm or more and 10 μm or less, the protrusion size is 0.4 or more and 0.8 or less times as much as the protrusion pitch, and the protrusion height is 0.4 or more times as much as the protrusion gap (Examples 1 to 4), the average number of the needle crystal scintillator particles corresponding to the respective protrusions may be caused to be 5 or less, which is extremely small, and thus, the needle crystals may be effectively separated from one another even in an early stage of growth of the scintillator, and light emitted by the scintillator may be guided to the photodetector portion with reduced spreading. This increases the amount of light which reaches the photodetector portion and received thereby, and as a result, the sensitivity of the element is improved. Further, the dispersion of light emitted by the scintillator is suppressed, and thus, the resolution of the element may be improved. This effect is enhanced when the arrangement is a hexagonal arrangement and the pitch and the gap in the arrangement are limited to specific ranges, as in Examples 1 to 4, and in Example 5 in which a reflective film of Al is provided on the protruding pattern.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-127078, filed Jun. 7, 2011, which is hereby incorporated by reference herein in its entirety.

What is claimed is:

1. A radiation detector comprising:
   multiple pixels, wherein each of said multiple pixels is a radiation detecting element comprising:
   needle crystal scintillators;
   a protruding pattern layer including multiple protrusions, each having a surface, with a gap between them; and
   a photodetector configured to detect scintillation light emitted by said needle crystal scintillators, wherein:
   one end of said needle crystal scintillators is in contact with the surfaces of said multiple protrusions;
   a gap corresponding to the gap between said multiple protrusions is provided between portions of said needle crystal scintillators where said needle crystal scintillators are in contact with said surfaces of said multiple protrusions; and
   the number of said needle crystal scintillators which are in contact with the surface of one of said multiple protrusions is 5 or less, and
   wherein at least two of said multiple protrusions are arranged on one of said photo detectors.

2. The radiation detecting element according to claim 1, wherein:
   a pitch between said multiple protrusions is 2 μm or more and 10 μm or less;
   said gap between said multiple protrusions is 1.5 μm or more; and
   a size of said protrusions is 0.4 or more and 0.8 or less times as much as said pitch of said multiple protrusions.

3. The radiation detecting element according to claim 2, wherein said protrusions have a height which is at least 0.4 or more times as much as said gap between said multiple protrusions.

4. The radiation detecting element according to claim 1, wherein:
   a pitch of said multiple protrusions is 5 μm or more and 10 μm or less;
   said gap between said multiple protrusions is 2 μm or more;
   a size of said protrusions is 0.4 or more and 0.7 or less times as much as said pitch of said multiple protrusions; and
   said multiple protrusions have a height which is at least 0.4 or more and 2.5 or less times as much as said gap between said multiple protrusions.

5. The radiation detecting element according to claim 1, wherein said protrusions have a high transmittance with respect to scintillation light and have a refractive index which is lower than a refractive index of said needle crystal scintillators.

6. The radiation detecting element according to claim 1, wherein said protrusions have a high reflectivity with respect to scintillation light.

7. The radiation detecting element according to claim 1, wherein said needle crystal scintillators contain CsI.

8. The radiation detector according to claim 1, wherein said multiple protrusions are each a half or less of a size of said pixel.

9. A radiation detector comprising:
   multiple pixels, wherein each of said multiple pixels is a radiation detecting element comprising:
   needle crystal scintillators;
   a protruding pattern layer including multiple protrusions each having a surface, with a gap between them; and
   a photodetector configured to detect scintillation light emitted by said needle crystal scintillators, wherein:
   one end of said needle crystal scintillators is in contact with the surfaces of said multiple protrusions;
   a gap corresponding to the gap between said multiple protrusions is provided between portions of said needle crystal scintillators where said needle crystal scintillators are in contact with said surfaces of said multiple protrusions; and
   the number of said needle crystal scintillators which are in contact with the surface of one of said multiple protrusions is 5 or less, and
   wherein at least two of said multiple protrusions are arranged in one of said pixels.

10. A radiation detector comprising;
multiple pixels, wherein each of said multiple pixels comprises:
  needle crystal scintillators;
  a protruding pattern layer including multiple protrusions each having a surface, with a gap between them; and
  a photodetector configured to detect scintillation light emitted by said needle crystal scintillators, wherein:
  one end of said needle crystal scintillators is in contact with the surfaces of said multiple protrusions; and
  a gap corresponding to the gap between said multiple protrusions is provided between portions of said needle crystal scintillators where said needle crystal scintillators are in contact with said surfaces of said multiple protrusions, and
  wherein at least two of the multiple protrusions are arranged on one of said photodetectors.

* * * * *